US007013719B2

(12) United States Patent
Adachi et al.

(10) Patent No.: US 7,013,719 B2
(45) Date of Patent: Mar. 21, 2006

(54) DEVICE FOR IDENTIFYING CRANK ANGLE OF ENGINE

(75) Inventors: Hitoshi Adachi, Osaka (JP); Hideo Shiomi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/506,894

(22) PCT Filed: Sep. 25, 2003

(86) PCT No.: PCT/JP03/12291

§ 371 (c)(1), (2), (4) Date: Sep. 7, 2004

(87) PCT Pub. No.: WO2004/031560

PCT Pub. Date: Apr. 15, 2004

(65) Prior Publication Data

US 2005/0160803 A1 Jul. 28, 2005

(30) Foreign Application Priority Data

Sep. 30, 2002 (JP) ............................ 2002-285874

(51) Int. Cl.
*G01M 15/00* (2006.01)

(52) U.S. Cl. ..................................................... 73/117.3

(58) Field of Classification Search .................. 73/116, 73/117.2, 117.3, 118.1
See application file for complete search history.

(56) References Cited

U.S. PATENT DOCUMENTS 6,041,647 A * 3/2000 Matsuoka .................... 73/116
6,302,085 B1 * 10/2001 Sekine et al. .......... 123/406.62
6,341,253 B1 1/2002 Honda
6,575,136 B1 * 6/2003 Namari .................. 123/406.58
6,609,498 B1 * 8/2003 Mathews et al. ...... 123/406.62
6,650,994 B1 * 11/2003 Muhlberger et al. ........ 701/114

(Continued)

FOREIGN PATENT DOCUMENTS

JP 06-213057 A1 8/1994

(Continued)

OTHER PUBLICATIONS

International Search Report for PCT/JP03/12291 mailed on Jan. 27, 2004.

*Primary Examiner*—Eric S. McCall
(74) *Attorney, Agent, or Firm*—Rader, Fishman & Grauer PLLC

(57) ABSTRACT

The present invention includes first signal set determining means 35 for determining a signal set to be a first signal set when determination by first determining means 33 of a crank angle detecting signal determining means for every one rotation and determination by second determining means 34 of a cam angle detecting signal for every one rotation are performed within a predetermined angle; second signal set determining means 36 for determining a signal set to be a second signal set when determination of a crank angle detecting signal for every one rotation and determination by the second determining means of a cam angle detecting signal corresponding to a cylinder are performed within a predetermined angle, and count reference determining means 37 for determining a cylinder number corresponding to the first or the second signal when signal sets are determined to be the first, the second and the first signal set or the second, the first, and the second signal set sequentially in this order, and also determining a generation point of the present crank angle detecting signal to be a count reference of the crank angle.

13 Claims, 10 Drawing Sheets

U.S. PATENT DOCUMENTS

| | | | | |
|---|---|---|---|---|
| 6,776,033 | B1 * | 8/2004 | Hori et al. | 73/117.3 |
| 6,796,169 | B1 * | 9/2004 | Makino et al. | 73/117.3 |
| 6,889,540 | B1 * | 5/2005 | Yonezawa et al. | 73/117.3 |
| 2003/0168044 | A1 * | 9/2003 | Rupp et al. | 123/406.18 |
| 2004/0083800 | A1 * | 5/2004 | Yonezawa et al. | 73/118.1 |
| 2004/0182142 | A1 * | 9/2004 | Nakamura et al. | 73/118.1 |

FOREIGN PATENT DOCUMENTS

| | | | |
|---|---|---|---|
| JP | 07-004300 | A1 | 1/1995 |
| JP | 2000-297685 | A1 | 10/2000 |
| JP | 2002-180890 | A1 | 6/2002 |
| JP | 2003-293843 | A1 | 10/2003 |

* cited by examiner (a)

(b)

(c)

(d)

DEVICE FOR IDENTIFYING CRANK ANGLE OF ENGINE

TECHNICAL FIELD

The present invention relates to a device for identifying a crank angle that identifies a reference position of a crank angle of an engine to perform engine control. In particular, the present invention relates to countermeasures that allow precise identification of the crank angle in each cylinder of a four-cycle engine having a plurality of cylinders.

BACKGROUND ART

Conventionally, as a method for determining a cylinder of an engine, it is known to provide a protrusion for cylinder identification in each of two rotating members that rotate in synchronization with a crankshaft and a camshaft and to detect a rotation angle position of an engine from a signal generated by a detecting element provided in the vicinity of the locus of the protrusion of each of the two rotating members (i.e., see Japanese Laid-Open Patent Publication No. H01-203656).

In four-cycle engines, a cycle of four processes of intake, compression, expansion and exhaust is completed with two rotations of a crankshaft, and therefore the reference cylinder cannot be determined without two rotations of the crankshaft. Therefore, when cylinder identification is performed with only the protrusion provided in the rotating member that rotates in synchronization with the crankshaft, that is, a crankshaft synchronization rotating member, for example, in a six-cylinder engine, it can be determined that the cylinder of interest is either one of the first cylinder and the fourth cylinder, but it cannot be determined precisely whether the cylinder of interest is the first cylinder or the fourth cylinder.

For this reason, as the above-described example, only with the position and the structure of the protrusions for cylinder identification and detection or rotation angle position detection provided in the crankshaft synchronization rotating member and the camshaft synchronization rotating member that rotates in synchronization with the crankshaft and the camshaft, proper cylinder identification cannot be performed, if signals generated by either one of a first detecting element and a second detecting element provided in the crankshaft synchronization rotating member and the camshaft synchronization rotating member are abnormal. Furthermore, the crank angle in each cylinder cannot be identified precisely, either.

The present invention is carried out in view of the above problem, and the object of the present invention is to provide a device for identifying a crank angle of an engine that allows proper cylinder identification of a four-cycle engine having a plurality of cylinders and precise identification of the crank angle in each cylinder.

DISCLOSURE OF INVENTION

In order to achieve the above object, a device for identifying a crank angle of an engine of the present invention includes crank angle signal detecting means that is supplied with a crank angle detecting signal for every predetermined angle and a crank angle detecting signal for every one rotation, based on a crankshaft synchronization rotating member that rotates in synchronization with a crankshaft; cam angle signal detecting means that is supplied with a cam angle detecting signal for every predetermined angle and a cam angle detecting signal for every one rotation, based on a camshaft synchronization rotating member that rotates in synchronization with a camshaft at a speed reducing ratio of ½ with respect to the crankshaft; first measuring means for measuring a generation time interval of the crank angle detecting signals obtained based on the crankshaft synchronization rotating member; second measuring means for measuring a generation time interval of the cam angle detecting signals obtained based on the camshaft synchronization rotating member; crank angle detecting signal determining means for comparing a generation time interval between the present and the previous crank angle detecting signals and a generation time interval between the previous and the previous before previous crank angle detecting signals measured by the first measuring means to determine whether the present crank angle detecting signal measured by the first measuring means is a crank angle detecting signal for every predetermined angle or a crank angle detecting signal for every one rotation; cam angle detecting signal determining means for comparing a generation time interval between the present and the previous cam angle detecting signals and a generation time interval between the previous and the previous before previous cam angle detecting signals measured by the second measuring means to determine whether the present cam angle detecting signal measured by the second measuring means is a cam angle detecting signal for every predetermined angle or a cam angle detecting signal for every one rotation; first signal set determining means for determining a signal set to be a first signal set when determination of the crank angle detecting signal determining means that the signal is a crank angle detecting signal for every one rotation and determination of the cam angle detecting signal determining means that the signal is a cam angle detecting signal for every one rotation are performed within a predetermined angle; second signal set determining means for determining a signal set to be a second signal set when determination of the crank angle detecting signal determining means that the signal is a crank angle detecting signal for every one rotation and determination of the cam angle detecting signal determining means that the signal is a cam angle detecting signal for every predetermined angle are performed within a predetermined angle; and count reference determining means for determining a cylinder number corresponding to the first signal or the second signal, and also determining a generation point of the present crank angle detecting signal measured by the first measuring means to be a count reference of the crank angle, when signal sets are determined by the first signal set determining means and the second signal set determining means to be the first, the second and the first signal set or the second, the first, and the second signal set sequentially in this order.

With this feature, the count reference of the crank angle is determined based on not only the first signal set that is defined when the crank angle detecting signal for every one rotation of the crankshaft synchronization rotating member and the cam angle detecting signal for every one rotation of the camshaft synchronization rotating member 22 are detected within a predetermined angle of the crankshaft synchronization rotating member, but also the second signal set that is defined when the crank angle detecting signal for every one rotation of the crankshaft synchronization rotating member and the cam angle detecting signal for every predetermined angle of the camshaft synchronization rotating member are detected within a predetermined angle of the crankshaft synchronization rotating member. Therefore, the count reference of the crank angle can be determined in an early stage.

In this case, the count reference of the crank angle is determined with the signal sets that are consecutive in the order of the first, the second, and the first signal set or the second, the first, and the second signal set, so that the cylinder number of the engine and the identification accuracy can be improved.

In the above configuration, the device for identifying a crank angle of an engine may include first count reference provisionally determining means for provisionally determining a cylinder number corresponding to the first or the second signal and also provisionally determining a generation point of the present crank angle detecting signal measured by the first measuring means to be a count reference, when an initial signal set is determined by the first signal set determining means and the second signal set determining means.

With this configuration, the cylinder number of the engine and the count reference of the crank angle are provisionally determined based on the first or the second initial signal set, so that if control of the engine is started based on the thus provisionally determined cylinder number of the engine and count reference of the crank angle, the responsibility of the engine can be enhanced.

In the above configuration, the device for identifying a crank angle of an engine may include crank angle signal counting means for counting the number of signal generations every time a crank angle detecting signal is generated; and cylinder number update means for resetting the number of times of generation of detecting signals, and updating the cylinder number, when the number of times of generation of the crank angle detecting signal counted by the crank angle signal counting means reaches a predetermined value.

With this feature, it is not necessary to control the engine with prepared control coefficients for each cylinder corresponding to the crank angle detecting signals for two rotations of the crankshaft synchronization rotating member. For example, if the number of generations of the crank angle detecting signals for one cylinder is set as the predetermine value at which the number of generation of detecting signals is reset, it is possible to control the engine with control coefficients corresponding to the crank angle detecting signals for one cylinder, so that the burden on the control device of the engine can be reduced.

In the above configuration, the device for identifying a crank angle of an engine may include additional condition considering means for determining as an additional condition whether or not the cylinder number and the number of generation of the crank angle detecting signals are those corresponding to the first or the second signal set when determining the next and following signal sets after the initial signal set has been determined by the first signal set determining means and the second signal set determining means.

With this feature, when determining the next and following signal sets, it is determined as an additional condition whether or not the cylinder number and the number of generation of the crank angle detecting signals are those corresponding to the first or the second signal set. Therefore, the determination accuracy of the second and the following signal sets can be improved.

In the above configuration, the device for identifying a crank angle of an engine may include cylinder number crank angle detecting signal determining means for determining whether or not determination that the signal is a crank angle detecting signal for every one rotation has been obtained by the crank angle signal detecting determining means, when the cylinder number updated by the cylinder number update means is a predetermined number and the number of generation of the crank angle detecting signals counted by the counting means is a predetermined value.

With this feature, when the cylinder number is a predetermined number and the number of generation of the crank angle detecting signals is a predetermined value, a detection of the crank angle detecting signal for every one rotation is confirmed. Therefore, the engine can be controlled only by the crank angle detecting signals and the cam angle detecting signals can be eliminated as a determining factor, so that interruption processing of the cam angle detecting signals to the engine control device can be reduced. Thus, the burden on the control device of the engine can be reduced.

In the above configuration, the device for identifying a crank angle of an engine may include recording means for recording the number of times of consecutive determination of signal sets of the same number by the first signal set determining means and the second signal set determining means; and recording number abnormality determining means for determining that abnormality has been reached, when the number of times of recording recorded by the recording means reaches a predetermined number of times.

With this feature, abnormality determination can be performed by recording the number of times of consecutive determination of the signal sets of the same number.

In the above configuration, the device for identifying a crank angle of an engine may include signal set number reset means for resetting the number of times of consecutive determination of signal sets of the same number that is recorded in the recording means, when it is determined by the count reference determining means that a generation point of the present crank angle detecting signal measured by the first measuring means is a count reference of the crank angle.

With this feature, when it is determined that the count reference of the crank angle has reached, the number of times of consecutive determination of the signal sets of the same number is reset, that is, error factors can be eliminated, and the next determination of the count reference of the crank angle can be performed without carrying the error factors over.

In the above configuration, the device for identifying a crank angle of an engine may include maximum time determining means for determining that a generation time interval of a cam angle detecting signal measured by the second measuring means that is a predetermined time or more is a maximum time; and cam angle detecting signal invalid determining means for determining that the present cam angle detecting signal is invalid, when the generation time interval between the present and the previous cam angle detecting signals or the generation time interval between the previous and the previous before previous cam angle detecting signals measured by the second measuring means is determined to be the maximum time by the maximum time determining means, regardless of the determination results of the cam angle detecting signal determining means as to whether the signal is a cam angle detecting signal for every predetermined angle or a cam angle detecting signal for every one rotation.

With this feature, for example, at the time of engine start or restart, or due to erroneous detection of a cam angle detecting signal because a cam angle detecting signal is missing or noise is mixed, it may be determined erroneously that the signal is a cam angle detecting signal for every one rotation, although it is a cam angle detecting signal for every predetermined angle, when the generation time interval between the present and the previous cam angle detecting signals is compared with the previous generation time interval between the previous and previous before previous cam angle detecting signals. However, if the generation time interval between cam angle detecting signals is determined to be the maximum time when it is a predetermined time or more, the present cam angle detecting signal is determined to be invalid. Thus, erroneous identification of a cam angle detecting signal can be reduced and the determination accuracy of the count reference of the crank angle can be further enhanced.

In the above configuration, at least one of the crank angle detecting signal determining means and the cam angle detecting signal determining means may be provided with abnormality determining means.

With this feature, for example, even if a pulse signal is missing or noise is mixed because of the abnormality of the detecting means or portions to be detected, the following determination can be performed: it is determined by the crank angle detecting signal determining means whether or not the crank angle detecting signal is abnormal when the generation time interval between the present and the previous crank angle detecting signals is compared with the generation time interval between the previous and the previous before the previous crank angle detecting signals in order to determine whether or not the crank angle detecting signal is a crank angle detecting signal with a short interval for every predetermined angle or a crank angle detecting signal for every one rotation; and it is determined by the cam angle detecting signal determining means whether or not the cam angle detecting signal is abnormal when the generation time interval between the present and the previous cam angle detecting signals is compared with the generation time interval between the previous and the previous before the previous cam angle detecting signal in order to determine whether the cam angle detecting signal is a cam angle detecting signal for every predetermined angle or a cam angle detecting signal for every one rotation.

In the above configuration, abnormality determination conditions for the abnormality determining means may be based on a running state of an engine.

With this feature, for example, even if the rotation speeds of the crankshaft synchronization rotating member and the camshaft synchronization rotating member are changed by the running conditions of the engine such as the load on the engine, at the time immediately after the start or acceleration or deceleration, the abnormality of the first determining means and the abnormality of the second determining means can be determined smoothly without depending on the running state.

In the above configuration, the abnormality determining means may be provided in at least the crank angle detecting signal determining means, the abnormality determining means may be provided with control timing measuring means for measuring a time interval from a time when a cam angle detecting signal for every one rotation by the cam angle detecting signal determining means to start of engine control; and when it is determined by the abnormality determining means that abnormality has been reached, a time interval from determination of a cam angle detecting signal for every one rotation to start of engine control may be measured by the control timing measuring means.

With this feature, when the crank angle detecting signal for every predetermined angle and the a crank angle detecting signal for every one rotation are not reliable because of abnormality determination in the crank angle detecting signal determining means, the engine control start timing from the point of time when a cam angle detecting signal that is one for every one rotation is detected by the cam angle detecting signal determining means is measured. Then, without depending on the crank angle detecting signal for every predetermined angle and the crank angle detecting signal for every one rotation, engine control start timing can be determined smoothly based on the measured value from the point of time when a cam angle detecting signal for every one rotation is detected by the cam angle detecting signal determining means.

In the above configuration, the abnormality determining means may be provided in at least the crank angle detecting signal determining means, and the device of the present invention may include cam angle reference control timing measuring means for measuring a time interval from when a cam angle detecting signal for every predetermined angle or a cam angle detecting signal for every one rotation is determined by the cam angle detecting signal determining means to start of engine control; cam angle detecting signal counting means for counting the number of times of signal generation every time a cam angle detecting signal is generated from when a cam angle detecting signal for every predetermined angle or a cam angle detecting signal for every one rotation is determined by the cam angle detecting signal determining means; and cam angle detecting signal resetting means for resetting the number of times of generation of cam angle detecting signals counted by the cam angle detecting signal counting means when a cam angle detecting signal for every predetermined angle or a cam angle detecting signal for every one rotation is determined by the cam angle detecting signal determining means, wherein when it is determined by the abnormality determining means that abnormality has been reached, engine control is performed by the cam angle reference control timing measuring means.

With this feature, when the crank angle detecting signal for every predetermined angle and the a crank angle detecting signal for every one rotation are not reliable because of abnormality determination in the crank angle detecting signal determining means, the engine control start timing from the point of time when a cam angle detecting signal for every predetermined angle is detected by the cam angle detecting signal determining means is measured. Then, without depending on the crank angle detecting signal for every predetermined angle and the crank angle detecting signal for every one rotation, engine control start timing can be determined smoothly based on the count number from the point of time when a cam angle detecting signal for every predetermined angle is detected by the cam angle detecting signal determining means.

In the above configuration, the abnormality determining means may be provided in at least the cam angle detecting signal determining means, the device of the present invention may include engine behavior determining means for determining behavior of an engine; second count reference provisionally determining means for provisionally determining a cylinder number and determining that a generation point of the present crank angle detecting signal is a count reference of the crank angle, when the present crank angle detecting signal measured by the first measuring means is determined to be a crank angle detecting signal for every one rotation by the crank angle detecting signal determining means; and cylinder number-correct-or-not-determining means that continues engine control based on the crank angle detecting signal, and determines whether the cylinder number provisionally determined by the second count reference provisionally determining means is correct or not, based on the behavior of the engine determined by the engine behavior determining means when it is determined by the abnormality determining means that abnormality has been reached.

With this feature, when the cam angle detecting signal for every predetermined angle and the cam angle detecting signal for every one rotation are not reliable because of abnormality determination in the cam angle detecting signal determining means, the cylinder number is determined provisionally with the crank angle detecting signal that is one for every one rotation that are determined by the crank angle detecting signal determining means, and that point is determined to be the count reference of the crank angle, and then the engine control continues. If there is no problem in the behavior of the engine when the engine control is performed, it is determined that the provisionally determined cylinder number is correct. On the other hand, if there is any problem in the behavior of the engine, it is determined that the provisionally determined cylinder number is not correct. Therefore, engine control start timing can be determined smoothly based on the measured value from the point of time when a crank angle detecting signal for every one rotation is detected by the crank angle detecting signal determining means, without depending on the cam angle detecting signal for every predetermined angle and the cam angle detecting signal for every one rotation.

BRIEF DESCRIPTION OF DRAWINGS

FIG. 3(*b*) is a diagram in which the protrusions of a crankshaft synchronization rotating member are developed. FIG. 3(*c*) is a diagram showing waveform signals formed by amplifying electromagnetic pick-up output signals detected by the crank angle signal detecting means. FIG. 3(*d*) is a diagram showing rectangular pulse signals of obtained by converting the waveform signals.

FIG. 4(*b*) is a diagram in which the protrusions of a camshaft synchronization rotating member are developed. FIG. 4(*c*) is a diagram showing waveform signals formed by amplifying electromagnetic pick-up output signals detected by the cam angle signal detecting means. FIG. 4(*d*) is a diagram showing rectangular pulse signals obtained by converting the waveform signals.

BEST MODE FOR CARRYING OUT THE INVENTION

Hereinafter, embodiments of the present invention will be described with reference of the accompanying drawings.

Figure 1:
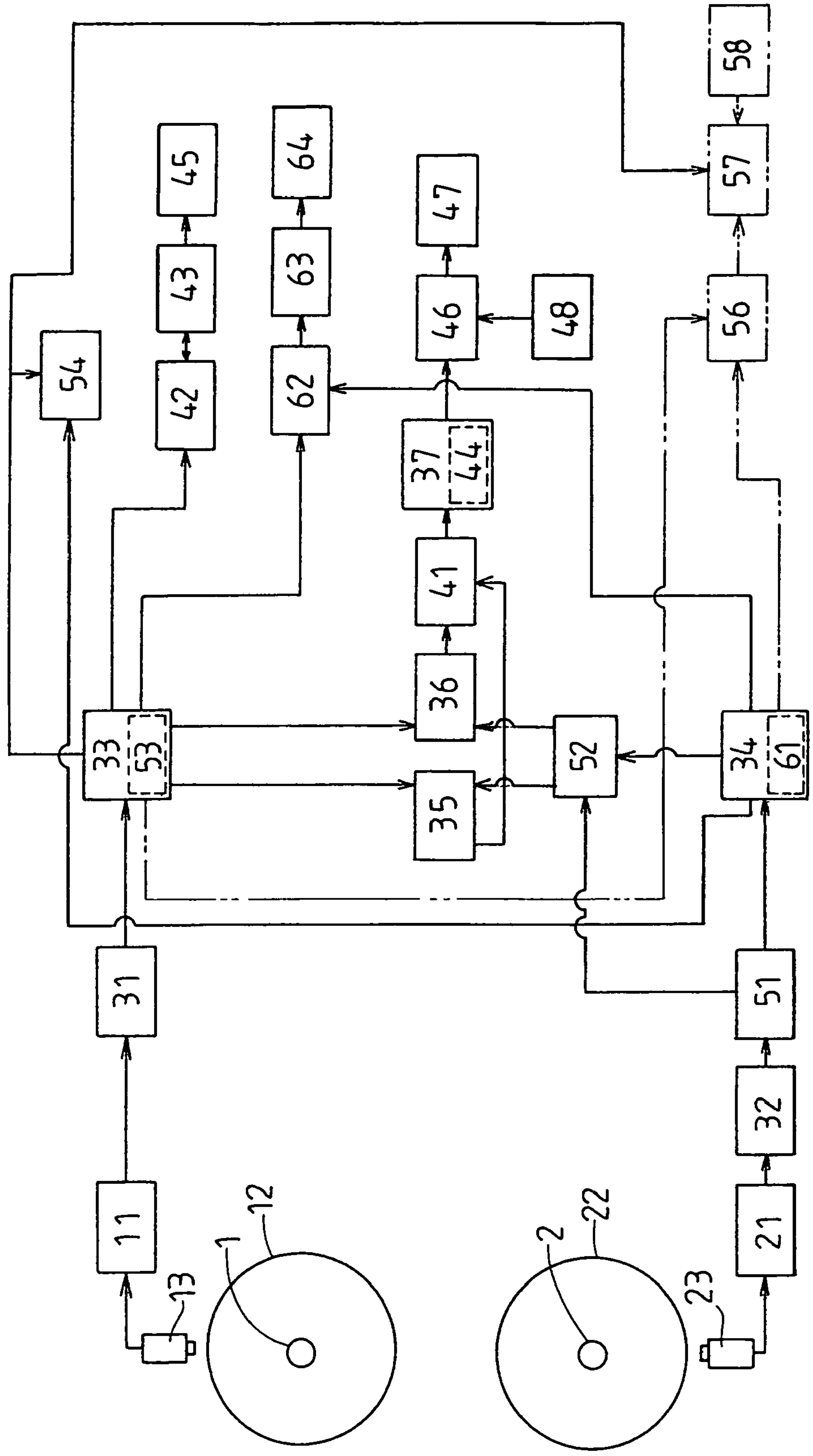
FIG. 1 is a functional block diagram showing a schematic configuration of a device for identifying a crank angle of an engine of an embodiment of the present invention.
Figure 2:
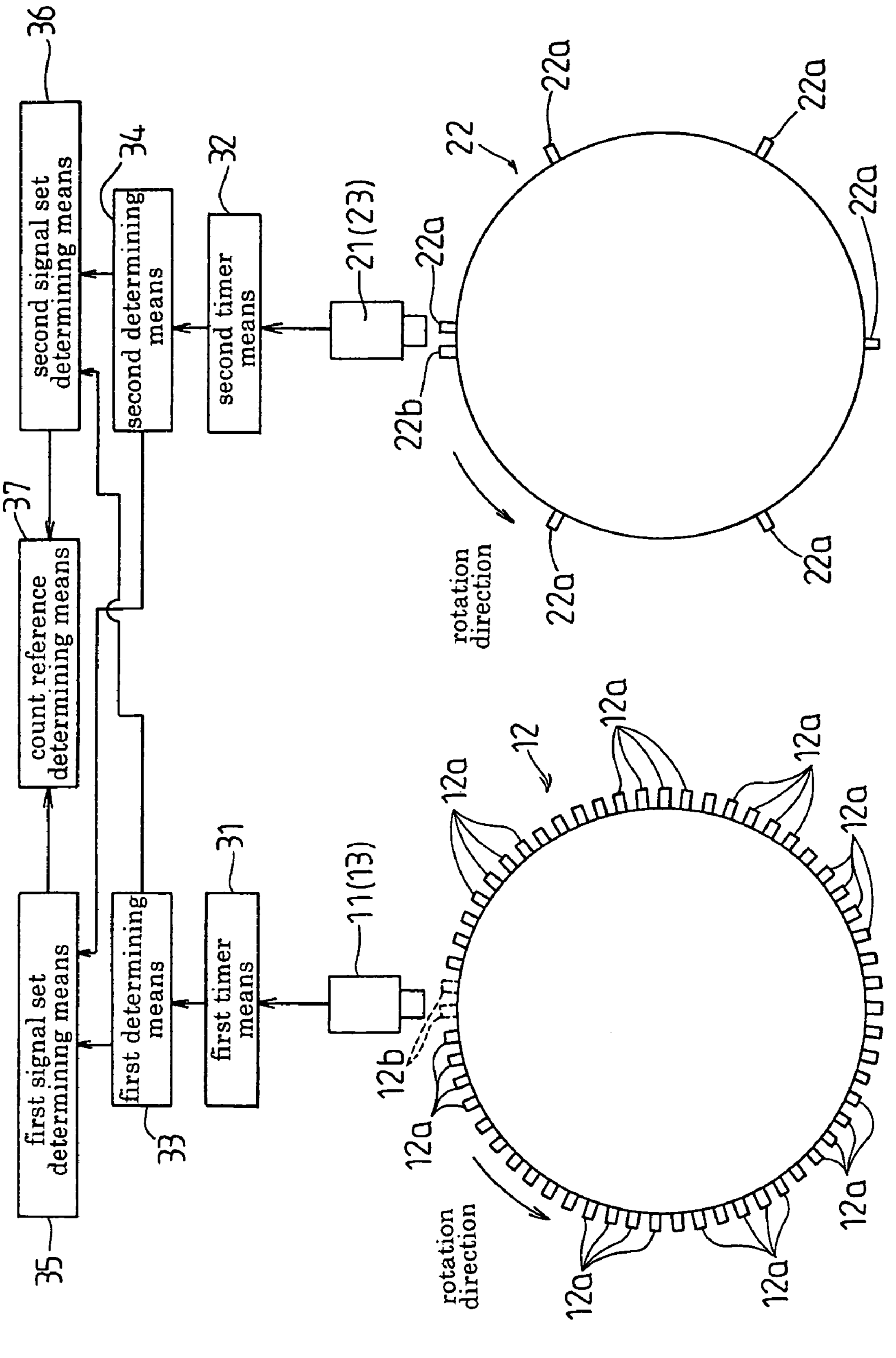
FIG. 2 is a basic configuration diagram of a device for identifying a crank angle schematically showing crank angle signal detecting means and cam angle signal detecting means.

FIG. 1 is a functional block diagram showing a schematic configuration of a device for identifying a crank angle of a six-cylinder engine of an embodiment of the present invention. FIG. 2 is a configuration diagram schematically showing crank angle signal detecting means and cam angle signal detecting means in FIG. 1.

In FIGS. 1 and 2, reference numeral 1 denotes a crankshaft, and reference numeral 2 denotes a camshaft, and the camshaft 2 is rotated in synchronization with the crankshaft 1 at a speed reducing ratio of ½ of the crankshaft by a mechanism that is not shown.

The crankshaft 1 includes crank angle signal detecting means 11 that is supplied with a detecting signal for every predetermined angle and a detecting signal for every one rotation associated with the rotation of the crankshaft 1. The crank angle signal detecting means 11 includes a crankshaft synchronization rotating member 12 that is coupled so as to be rotated together with and in synchronization with the crankshaft 1, a plurality of protrusions 12*a*, . . . that are provided along the outer circumference of the crankshaft synchronization rotating member 12 at every predetermined angle, and an electromagnetic pick-up type of crank angle signal detector 13.

The protrusions 12*a* of the crankshaft synchronization rotating member 12 are provided so as to be projected outward in the radial direction at every 6 degrees of the crank angle with a small gap that is substantially the same as the width in the circumferential direction of each protrusion 12*a* between the adjacent protrusions 12*a*, 12*a*. Two consecutive protrusions 12*a*, 12*a* are missing immediately before the reference position A (see FIG. 3(*a*)) of the crank angle (this missing protrusion is referred to as "missing protrusion 12*b*"). In this case, the protrusions 12*a*, . . . are provided in the circumferential direction of the crankshaft synchronization rotating member 12 at every 6 degrees of the crank angle, but the number of the missing protrusions 12*b*, 12*b*, which is 2, is subtracted, so that 58 protrusions are provided. The crank angle detecting signals for every predetermined angle of the crankshaft synchronization rotating member 12 are detecting signals detected in a short interval of every 6 degrees of the crank angle that are output for every time the protrusion 12a is detected in the circumferential direction of the crankshaft synchronization rotating member 12, and are detected 58 times per one rotation of the crankshaft rotating member 12. On the other hand, the crank angle detecting signal for every rotation of the crankshaft synchronization rotating member 12 is a detecting signal with a long interval that detects the two missing protrusions 12b that are missing consecutively in the circumferential direction of the crankshaft synchronization rotating member 12, and is detected only once when the crankshaft synchronization rotating member 12 is rotated once.

The camshaft 2 includes cam angle signal detecting means 21 that is supplied with a detecting signal for every predetermined angle and a detecting signal for every one rotation associated with the rotation of the camshaft 2. The cam angle signal detecting means 21 includes a camshaft synchronization rotating member 22 that is coupled so as to be rotated together with and in synchronization with the camshaft 2, a plurality of protrusions 22a, . . . that are provided along the outer circumference of the camshaft synchronization rotating member 22 for every predetermined angle and an electromagnetic pick-up type of cam angle signal detector 23.

The protrusions 22a of the crankshaft synchronization rotating member 22 are provided so as to be projected outward in the radial direction in a position corresponding to every about 60 degrees of the cam angle in the circumferential direction of the camshaft synchronization rotating member 22. A single protrusion 22b is projected immediately before the reference position B (see FIG. 4(a)) of the cam angle, more specifically, in a position before and spaced apart by 6 degrees of the cam angle from the protrusion 22a in the reference position B of the crank angle. In this case, the protrusions 22a, . . . are provided in the number of 6, which corresponds to the number of the cylinders of the engine, in the circumferential direction of the camshaft synchronization rotating member 12.

The crank angle detecting signals for every predetermined angle of the camshaft synchronization rotating member 22 are detecting signals detected in a constant interval that are output every time the protrusion 22a is detected in the circumferential direction of the camshaft synchronization rotating member 22 and correspond to the cylinders one to one, and six signals are detected per one rotation of the camshaft rotating member 22. On the other hand, the cam angle detecting signals for every rotation of the camshaft synchronization rotating member 22 are specific detecting signals of a W pulse with a short interval, and two signals are detected in a short time with the protrusion 22a in the reference position B of the cam angle and the single protrusion 22b immediately before that, and this consecutive detection is detected only once (W pulse) for one rotation of the camshaft synchronization rotating member 22. In this case, as shown in FIG. 3(a) and FIG. 3(b), which is a developed view of FIG. 3(a), and FIG. 4(a) and FIG. 4(b), which is a developed view of FIG. 4(a), the detecting signals (electromagnetic pick-up output signals) detected by the crank angle signal detector 13 and the cam angle signal detector 23 are amplified by amplifying means of the crank angle signal detecting means 11 or the cam angle signal detecting means 21 and then converted to rectangular pulse signals by a waveform signal forming means. FIGS. 3(c) and 4(c), and FIG. 3(d) and FIG. 4(d) show the outputs from the amplifying means and the outputs from the waveform signal forming means, respectively. These pulse signals correspond to the protrusions 12a, 22a, and 22b one to one.

Figure 5:
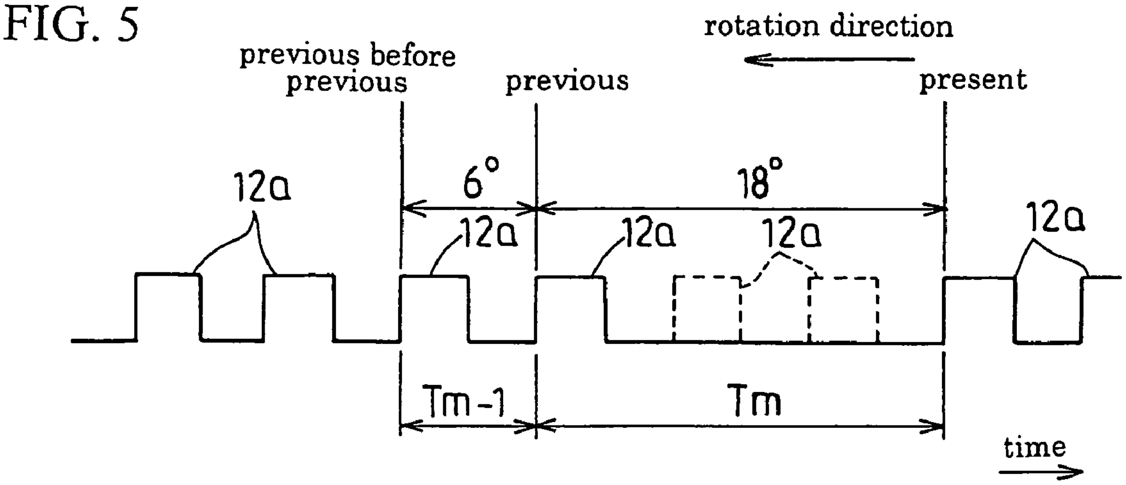
FIG. 5 is a waveform diagram of pulse signals illustrating the basis of determination of the crank angle detecting signal per a predetermined angle or the crank angle detecting signal for every one rotation by the first determining means.

In FIG. 1, reference numeral 31 denotes first timer means serving as a first measuring means, and the first timer means 31 measures the generation time interval of the crank angle detecting signals for every predetermined angle and every one rotation obtained based on the crankshaft synchronization rotating member 12, in response to an output from the crank angle signal detector 13. Reference numeral 32 denotes second timer means as a second measuring means, and the second timer means 32 measures the generation time interval of the cam angle detecting signals for every predetermined angle and every one rotation obtained based on the camshaft synchronization rotating member 22, in response to an output from the cam angle signal detector 23. Furthermore, reference numeral 33 denotes first determining means serving as means for determining a crank angle detecting signal, and as shown in FIG. 5, the first determining means 33 determines the crank angle detecting signal in response to an output from the first timer means 31 in the following manner: the generation time interval between the present crank angle detecting signal and the previous crank angle detecting signal, that is, the generation time interval Tm between the two crank angle detecting signals of the adjacent protrusions 12a, 12a, measured by the first timer means 31 is compared with the previous generation time interval between the previous crank angle detecting signal and the previous before previous crank angle detecting signal, that is, the previous generation time interval Tm−1 between the two crank angle detecting signals of the adjacent protrusions 12a, 12a. Then, it is determined whether the crank angle detecting signal measured by the first timer means 31 is a crank angle detecting signal for every predetermined angle (crank angle detecting signal at every 6 degrees of the crank angle) or a crank angle detecting signal for every one rotation (specific crank angle detecting signal obtained by detecting the missing protrusion 12b that occurs once for every one rotation). In this case, the first determining means 33 perform determination in the following manner: when the generation time interval Tm of the crank angle detecting signals measured by the first timer means 31 is compared with the previous generation time interval Tm−1 of the crank angle detecting signals and a relationship $2 \leqq Tm/Tm-1 \leqq 4$ is satisfied, then it is determined that the present crank angle detecting signal is a crank angle detecting signal for every one rotation (specific crank angle detecting signal caused by the missing protrusion 12b). In this case, "2" and "4" that define the range of Tm/Tm−1 are constants that can be changed by engine running conditions such as load on the engine, at the time immediately after the start, or acceleration or deceleration.

Figure 6:
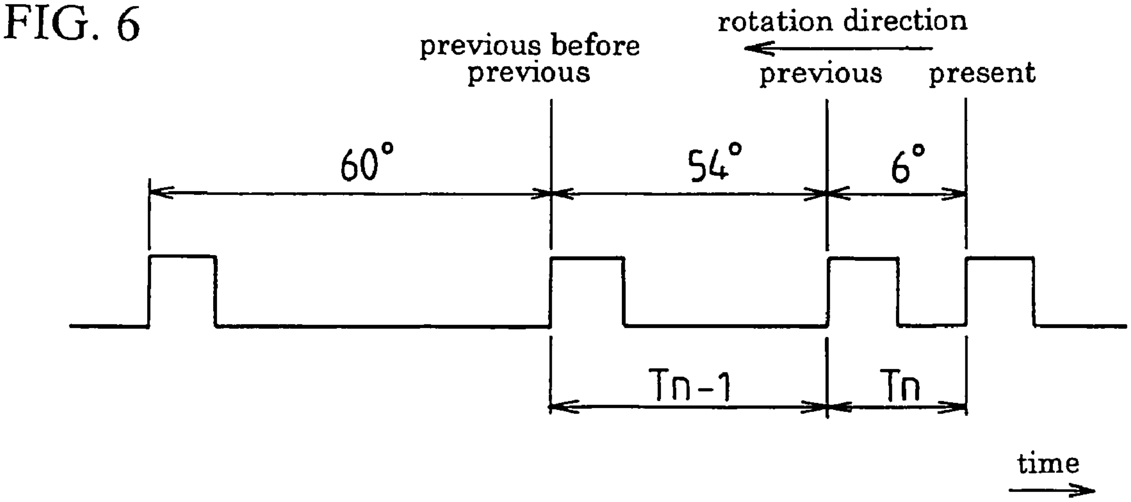
FIG. 6 is a waveform diagram of pulse signals illustrating the basis of determination of the cam angle detecting signal for every predetermined angle or the cam angle detecting signal for every one rotation by the second determining means.

On the other hand, reference numeral 34 denotes second determining means serving as means for determining a cam angle detecting signal, and as shown in FIG. 6, the second determining means 34 determines the cam angle detecting signal in response to an output from the second timer means 32 in the following manner: the generation time interval between the present cam angle detecting signal and the previous cam angle detecting signal, that is, the generation time interval Tn between the two cam angle detecting signals of the adjacent protrusions 22a, 22a, measured by the second timer means 32 is compared with the previous generation time interval between the previous cam angle detecting signal and the previous before previous cam angle detecting signal, that is, the previous generation time interval Tn−1 between the two cam angle detecting signals of the adjacent protrusions 22a, 22a. Then, it is determined whether the cam angle detecting signal measured by the second timer means 32 is a cam angle detecting signal for every predetermined angle, that is, a regular detecting signal of a single pulse (S pulse) associated with a corresponding cylinder, or a cam angle detecting signal for every one rotation, that is, a specific cam angle detecting signal of a double pulse (W pulse) for every one rotation. In this case, the second determining means 34 perform determination in the following manner: when the generation time interval Tn of the cam angle detecting signals measured by the second timer means 32 is compared with the previous generation time interval Tn−1 of the cam angle detecting signals and a relationship $0.1 \leqq Tn/Tn-1 \leqq 0.5$ is satisfied, then it is determined that the present cam angle detecting signal is a cam angle detecting signal for every one rotation (specific cam angle detecting signal of a W pulse). In this case, "0.1" and "0.5" that define the range of Tn/Tn−1 are constants that can be changed by engine running conditions such as the load on the engine, at the time immediately after the start, or acceleration or deceleration.

Figure 7:
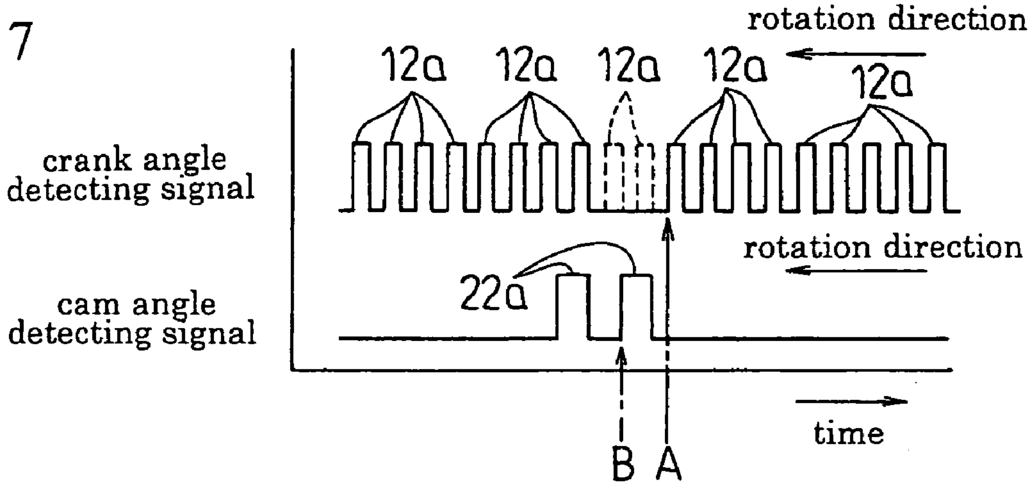
FIG. 7 is a waveform diagram of pulse signals illustrating the basis of determination of the first signal set by the first signal set determining means.

Reference numeral 35 denotes first signal set determining means and the first signal set determining means 35 performs determination in response to outputs from the first determining means 33 and cam angle detecting signal invalid determining means 52 (described later) in the following manner, as shown in FIG. 7: when the determination of the first determining means 33 that the signal is a crank angle detecting signal for every one rotation (one specific detecting signal for every one rotation) and the determination of the second determining means 34 that the signal is a cam angle detecting signal for every one rotation (specific detecting signal of a W pulse) are performed within a predetermined angle (e.g., within 30°) of the crankshaft synchronization rotating member 12, then it is determined to be a first signal set.

Figure 8:
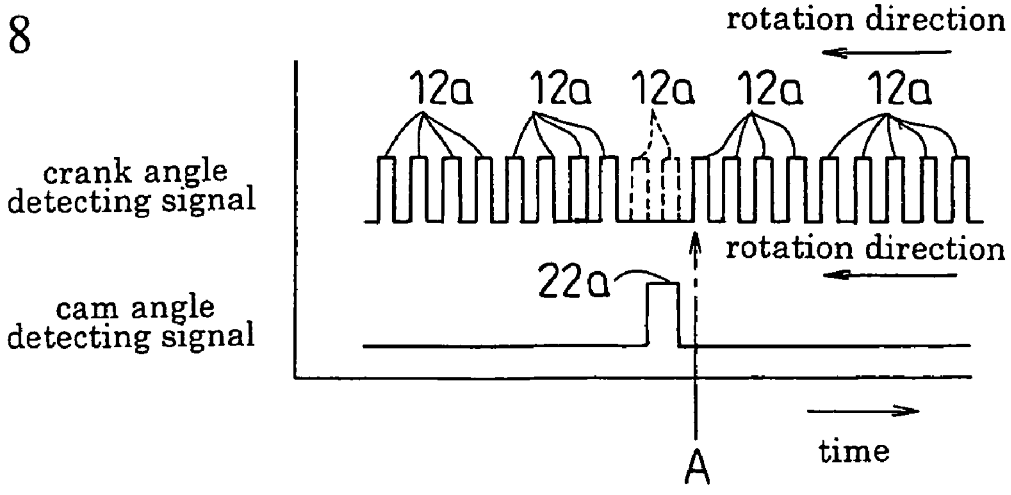
FIG. 8 is a waveform diagram of pulse signals illustrating the basis of determination of the second signal set by the second signal set determining means.

Reference numeral 36 denotes second signal set determining means, and the second signal set determining means 36 performs determination in response to outputs from the first determining means 33 and cam angle detecting signal invalid determining means 52 (described later) in the following manner, as shown in FIG. 8: when the determination of the first determining means 33 that the signal is a crank angle detecting signal for every one rotation and the determination of the second determining means 34 that the signal is a cam angle detecting signal for every predetermined angle (regular detecting signal of a S pulse) are performed within a predetermined angle (e.g., within 30°) of the crankshaft synchronization rotating member 12, then it is determined to be a second signal set.

Figure 3:
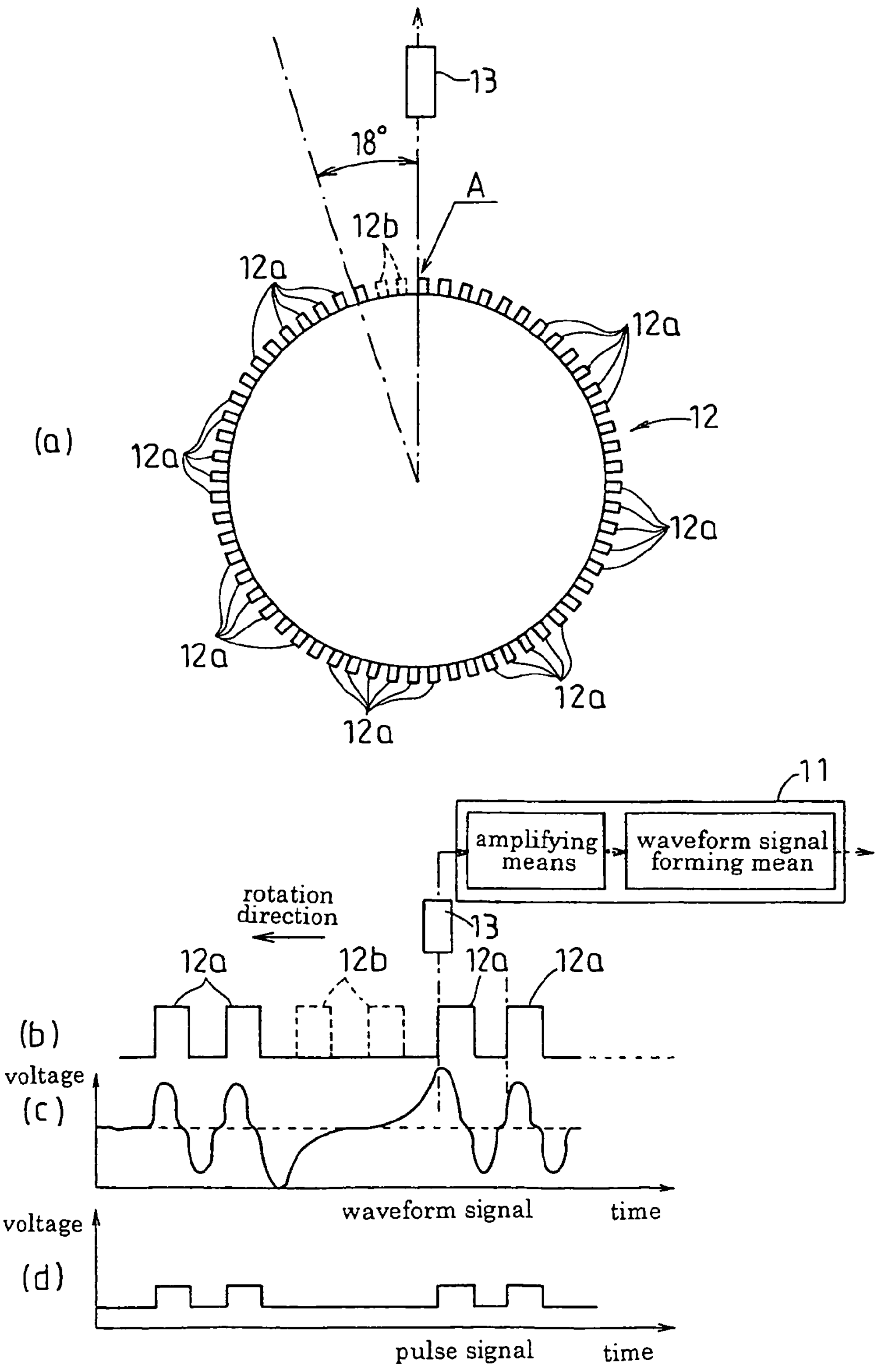
FIG. 3(*a*) is a diagram illustrating the reference position of a crank angle by the crank angle signal detecting means.
Figure 4:
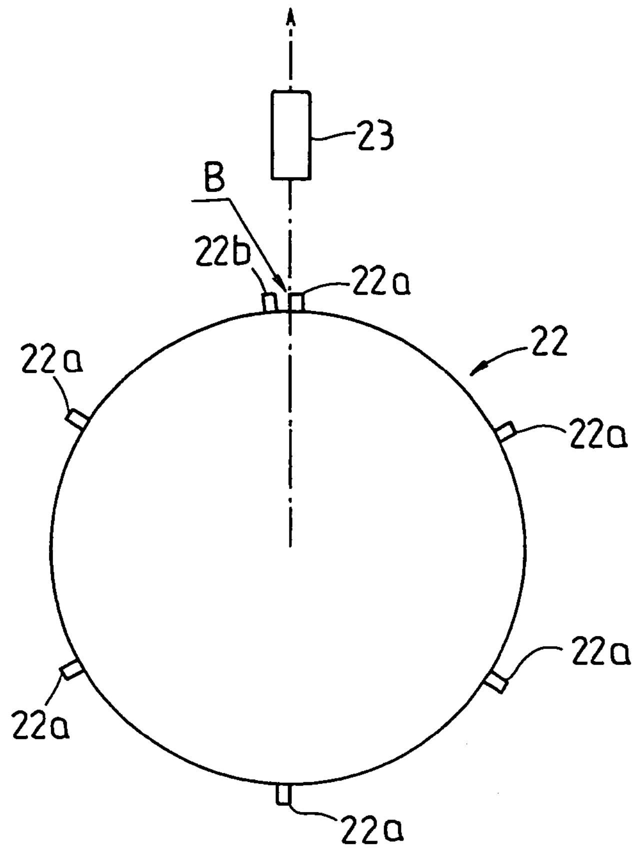
FIG. 4(*a*) is a diagram illustrating the reference position of a cam angle by the cam angle signal detecting means.
Figure 4:
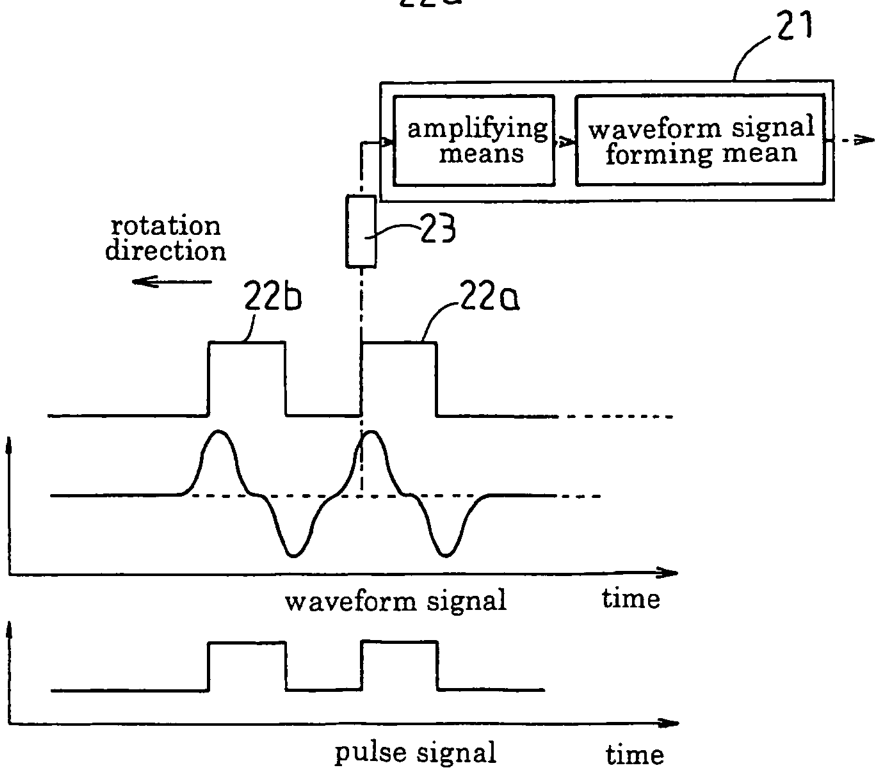

Furthermore, reference numeral 37 denotes count reference determining means, and the count reference determining means 37 performs determination in response to outputs from the first and the second signal set determining means 35, 36 in the following manner: when the signal sets are determined by the first and the second signal set determining means 35, 36 to be "the first signal set", "the second signal set" and "the first signal set" or "the second signal set", "the first signal set" and "the second signal set" sequentially in this order, then the cylinder number (first cylinder or fourth cylinder) corresponding to the first or the second signal set is determined, and also the generation point of a crank angle detecting signal for every one rotation that is measured by the first timer means 31 for the first time is determined to be the count reference A of the crank angle (the reference position A of the crank angle). In this case, as shown in FIG. 3(*a*), the count reference A of the crank angle (the reference position A of the crank angle) is defined at the rising edge portion of a pulse signal (protrusion 12*a*) in the rotation direction of the crankshaft synchronization rotating member 12. On the other hand, as shown in FIG. 4(*a*), the reference position B of the cam angle is defined at the rising edge portion of a pulse signal (protrusion 22*a*) in the rotation direction of the camshaft synchronization rotating member 22.

In FIG. 1, reference numeral 41 denotes first count reference provisionally determining means, and the first count reference provisionally determining means 41 performs determination in response to outputs from the first and the second signal set determining means 35, 36 in the following manner: when the initial signal set is determined by these signal set determining means 35, 36, then the cylinder number (the first cylinder or the fourth cylinder) corresponding to "the first signal set" or "the second signal set" is provisionally determined, and the generation point of a crank angle detecting signal for every one rotation that is measured by the first timer means 31 for the first time is determined to be the count reference A of the crank angle (the reference position A of the crank angle).

Figure 9:
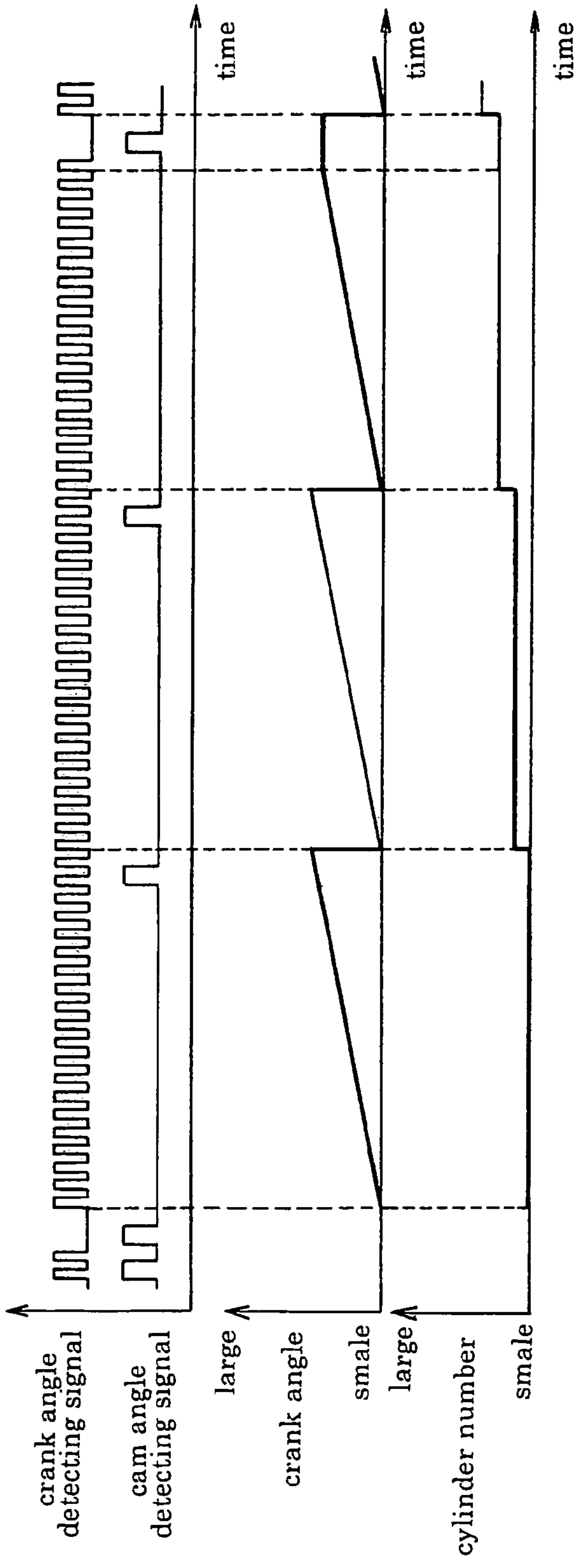
FIG. 9 is a diagram illustrating the basis of update of the cylinder number update means based on the crank angle detecting signal counting means.

Furthermore, reference numeral 42 denotes crank angle signal counting means, and in response to an output from the first determining means 33, the crank angle signal counting means 42 counts the number of signal generations every time a crank angle detecting signal based on the crankshaft synchronization rotating member 12 is generated. Reference numeral 43 denotes cylinder number update means, and as shown in FIG. 9, in response to an output from the crank angle signal counting means 42, the cylinder number update means 43 resets the number of times of generation of detecting signals and updates the cylinder number when the number of times of generation of the crank angle detecting signal for every predetermined angle based on the crankshaft synchronization rotating member 12 reaches a predetermined value. As the predetermined value at which the crank angle signal counting means 42 is reset, the number of the signal generation of the crank angle detecting signal for every predetermined angle based on the crankshaft synchronization rotating member 12 that corresponds to rotation for one cylinder (360°×2 rotations/6°/6 cylinders), that is, 20 is used. In this case, at a cylinder corresponding to the third cylinder or the sixth cylinder in which the missing protrusion 12*b* is present, the crank angle signal counting means 42 is reset at a predetermined value of 18, which is obtained by subtracting 2, which is the number corresponding to the two pulses due to the missing protrusions 12*b*.

In FIG. 1, reference numeral 44 denotes additional condition considering means, and in the additional condition considering means 44, when determining the next and following signal sets in the count reference determining means 37 after the initial signal set has been determined by the first and the second signal set determining means 35, 36, it is determined as an additional condition whether or not the cylinder number and the number of generation of the crank angle detecting signals are those corresponding to the first and the second signal set determining means 35, 36.

Reference numeral 45 denotes cylinder number crank angle detecting signal determining means, and the cylinder number crank angle detecting signal determining means 45 conducts determination in response to an output from the cylinder number update means 43 in the following manner: when the cylinder number updated by the cylinder number update means 43 is a predetermined number and the number of generation of the crank angle detecting signal counted by the crank angle signal counting means 42 is a predetermined number, it is determined whether or not determination that the signal is a crank angle detecting signal for every one rotation has been obtained in the first determining means 33.

In this case, the predetermined value of the number of generation of the crank angle detecting signals counted by the crank angle signal counting means 42 is 18, which is a value corresponding to rotation for one cylinder in which the missing protrusion 12*b* is present.

Reference numeral 46 denotes recording means, and in response to an output from the count reference determining means 37, the recording means 46 records the number of times of consecutive determination of signal sets of the same number by the first and the second signal set determining means 35, 36. Reference numeral 47 denotes recording number abnormality determining means, and in response to an output from the recording means 46, the recording number abnormality determining means 47 determines that abnormality has been reached, when the number of times of recording recorded by the recording means 46 reaches a predetermined number of times. The predetermined value (predetermined number of times) of recording in which it is determined by the recording number abnormality determining means 47 that abnormality has been reached is 3. Furthermore, reference numeral 48 denotes signal set number reset means, and the signal set number reset means 48 resets in response to an output from the count reference determining means 37 in the following manner: when it is determined by the count reference determining means 37 that the generation point of the present crank angle detecting signal measured by the first timer means 31 is the count reference of the crank angle, the number of times (twice or less) of consecutive determination of signal sets of the same number that is recorded in the recording means 46 is reset.

Figure 10:
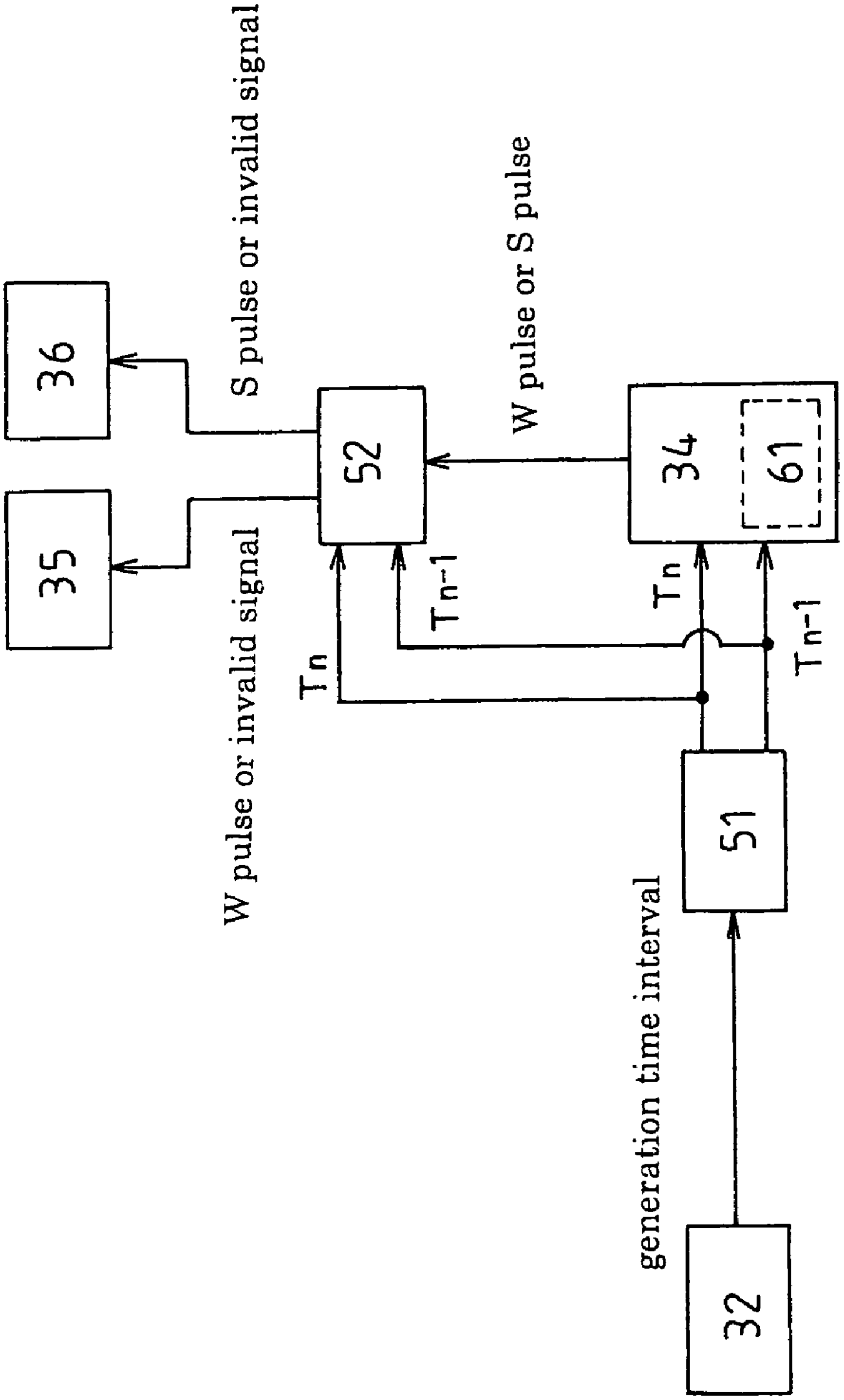
FIG. 10 is a block configuration diagram showing determination processing by the cam angle detecting signal invalid determining means.

As shown in FIG. 10, reference numeral 51 denotes maximum time determining means, and in the maximum time determining means 51, in response to an output from the second timer means 32, when the generation time interval of the cam angle detecting signal measured by the second timer means 32 is a predetermined time or more, that value is determined as the maximum time Tmax. Reference numeral 52 denotes cam angle detecting signal invalid determining means, and the cam angle detecting signal invalid determining means 52 conducts determination in response to the generation time interval Tn of the cam angle detecting signal from the maximum time determining means 51 and the previous generation time interval Tn−1 of the cam angle detecting signal in the following manner: when the generation time interval is determined to be the maximum time by the maximum time determining means 51, the present cam angle detecting signal is determined to be invalid, regardless of the determination results of the second determining means 34 as to whether the signal is a cam angle detecting signal for every predetermined angle or a cam angle detecting signal for every one rotation. To the cam angle detecting signal invalid determining means 52, a cam angle detecting signal for every one rotation (specific detecting signal of a W pulse) or a cam angle detecting signal for every cylinder (regular detecting signal of a S pulse) is input from the second determining means 34. Then, the cam angle detecting signal invalid determining means 52 outputs a specific detecting signal of a W pulse or an invalid signal to the first signal set determining means 35, and outputs a regular detecting signal of a S pulse or an invalid signal to the second signal set determining means 36.

Figure 11:
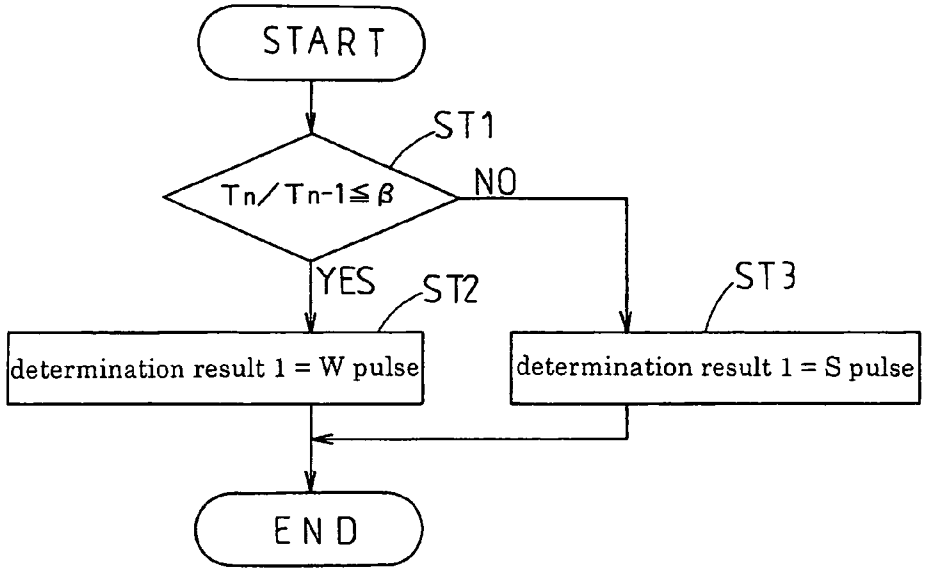
FIG. 11 is a flowchart showing the flow of determination of a double pulse by the second determining means.
Figure 12:
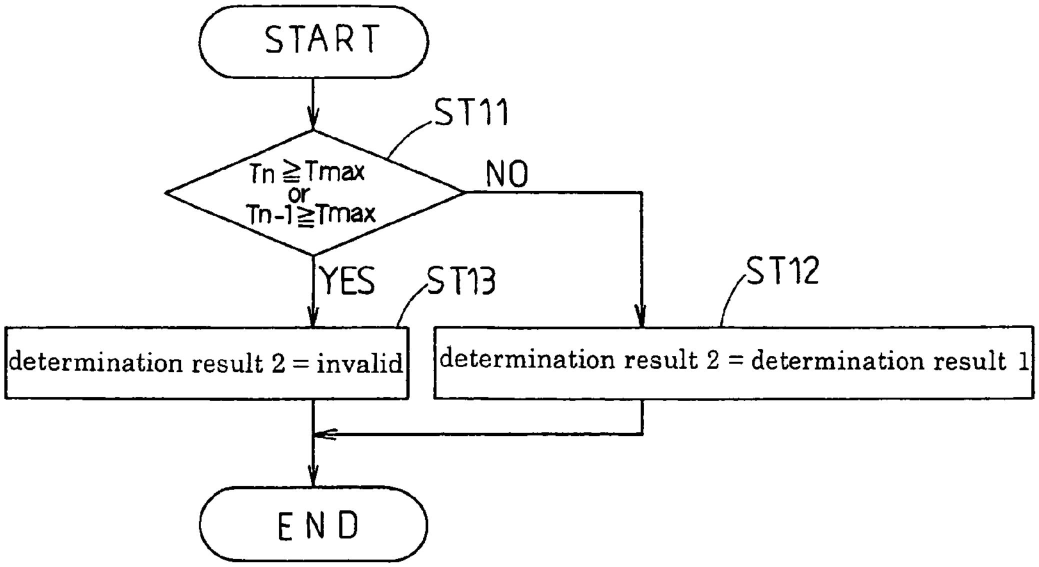
FIG. 12 is a flowchart showing the flow of determination by the cam angle detecting signal invalid determining means.
Figure 13:
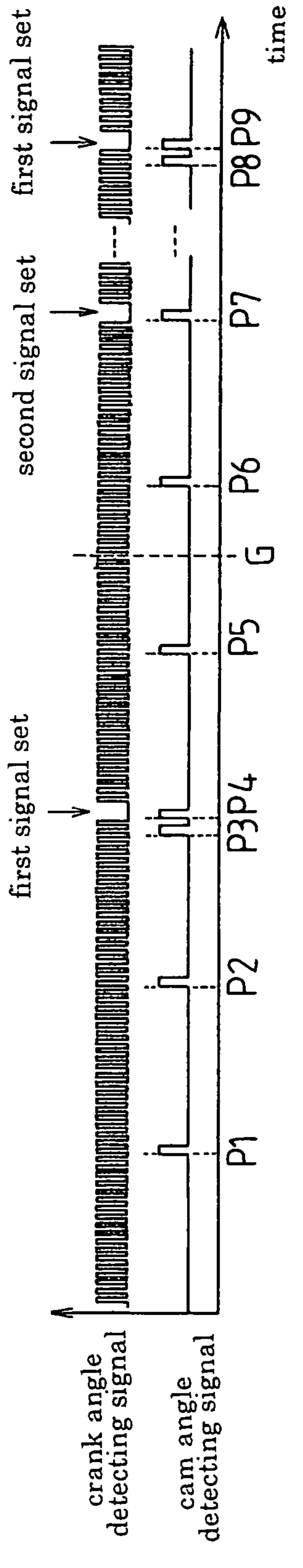
FIG. 13 is a diagram illustrating the basis of invalidity of a signal set by the first and the second signal set determining means from the point G at the time of the start of an engine.

More specifically, as shown in the flowchart of FIG. 11, in step ST1, when the result is YES in which the ratio of the generation time interval Tn of the cam angle detecting signals and the previous generation time interval Tn−1 of the cam angle detecting signals from the maximum time determining means 51 is a predetermined value B or less, in step ST2, it is determined that a cam angle detecting signal for every one rotation (specific detecting signal of a W pulse) is detected as the determination result 1. On the other hand, when the result is NO in which the ratio exceeds the predetermined value B, in step ST3, it is determined that a cam angle detecting signal for every predetermined rotation (regular detecting signal of a S pulse) is detected as the determination result 1. On the other hand, as shown in the flowchart of FIG. 12, in step ST11, when the result is NO in which both the generation time interval Tn of the cam angle detecting signals and the previous generation time interval Tn−1 of the cam angle detecting signals from the maximum time determining means 51 are smaller than the maximum time Tmax, in step ST12, the determination result 1 is taken as the determination result 2 from the maximum time determining means 51. When the result is YES in which at least one of the generation time interval Tn of the cam angle detecting signals and the previous generation time interval Tn−1 of the cam angle detecting signals from the maximum time determining means 51 is the maximum time Tmax or more, in step ST13, the result of the determination result 1 obtained above that is obtained as the determination result 2 (the present cam angle detecting signal) is determined to be invalid (is not adopted). Then, when the determination result 1 is taken as the determination result 2, determination is conducted by the first and the second signal set determining means 35, 36. For example, as shown in FIG. 13, when the signal set is determined by the first and the second signal set determining means 35, 36 from the position in which the crankshaft synchronization rotating member 12 and the camshaft synchronization rotating member 22 stop at point G at the time of the start of the engine, the results shown in Table 1 are obtained.

TABLE 1

| | P6 | P7 | . . . | P9 |
|---|---|---|---|---|
| generation time interval of cam angle detecting signal | indeterminate (Tmax) | normal value | . . . | normal value |
| determination result 1 | S pulse | W pulse | . . . | W pulse |
| determination result 2 | Invalid | invalid | . . . | W pulse |
| determination result of signal set | | undetermined | . . . | signal set 1 |

In FIG. 1, reference numeral 53 is first abnormality determining means, and the first abnormality determining means 53 is provided in the first determining means 33. Reference numeral 54 is control timing measuring means, and the control timing measuring means 54 measures the time interval from the time when a cam angle detecting signal for every one rotation (specific detecting signal of a W pulse) by the second determining means 34 to the start of engine control. The control timing measuring means 54 measures the time interval from determination of a cam angle detecting signal for every one rotation to the start of engine control, in response to an output from the first abnormality determining means 53, when it is determined by this first abnormality determining means 53 that abnormality has been reached.

Furthermore, reference numeral 61 denotes second abnormality determining means, and the second abnormality determining means 61 is provided in the second determining means 34. Reference numeral 62 denotes engine behavior determining means, and the engine behavior determining means 62 determines the behavior of the engine (behavior due to the load of the engine, behavior immediately after the start or acceleration or deceleration). Reference numeral 63 denotes second count reference provisionally determining means, and the second count reference provisionally determining means 63 provisionally determines the cylinder number and determines that the generation point of the present crank angle detecting signal is the count reference A of the crank angle (reference position A of the crank angle), when the present crank angle detecting signal measured by the first timer means 31 is determined to be a crank angle detecting signal for every one rotation by the first determining means 33. Reference numeral 64 is cylinder number-correct-or-not-determining means, and the cylinder number-correct-or-not-determining means 64 continues engine control based on the crank angle detecting signal, and determines whether the cylinder number provisionally determined by the second count reference provisionally determining means 63 is correct or not, based on the behavior of the engine determined by the engine behavior determining means 62 when it is determined by the second abnormality determining means 61 that abnormality has been reached.

Therefore, in this embodiment, the count reference of the crank angle is determined based on not only the first signal set that is defined when the crank angle detecting signal for every one rotation of the crankshaft synchronization rotating member 12 and the cam angle detecting signal for every one rotation of the camshaft synchronization rotating member 22 are detected within a predetermined angle (e.g., 30°) of the crankshaft synchronization rotating member 12, but also the second signal set that is defined when the crank angle detecting signal for every one rotation of the crankshaft synchronization rotating member 12 and the cam angle detecting signal for every predetermined angle of the camshaft synchronization rotating member 22 are detected within a predetermined angle (e.g., 30°) of the crankshaft synchronization rotating member 12. Therefore, the count reference of the crank angle can be determined in an early stage.

In this case, the count reference of the crank angle is determined with the signal sets that are consecutive in the order of "the first signal set", "the second signal set", "the first signal set" or "the second signal set", "the first signal set", "the second signal set", so that the cylinder number of the engine and the identification accuracy can be improved.

When the initial signal set is determined by the first signal set determining means 35 and the second signal set determining means 36, the cylinder number (the first cylinder or the fourth cylinder) corresponding to "the first signal set" or "the second signal set" is provisionally determined by the first count reference provisionally determining means 41 and the generation point of the present crank angle detecting signal measured by the first timer means 31 is provisionally determined to be the count reference A of the crank angle (reference position A of the crank angle). Therefore, if control of the engine is started based on the thus provisionally determined cylinder number of the engine and count reference A of the crank angle (reference position A of the crank angle), the responsibility of the engine can be enhanced.

Then, When the number of signal generations counted by the crank angle signal counting means 42 every time a crank angle detecting signal is generated has reached a predetermined value, the number of generations of the crank angle detecting signal is reset by the cylinder number update means 43, and the cylinder number is updated. Therefore, it is not necessary to control the engine with prepared control coefficients for each cylinder corresponding to the crank angle detecting signals for two rotations of the crankshaft synchronization rotating member 12. For example, if the number of generations of the crank angle detecting signals for one cylinder is set as the predetermine value at which the number of generation of detecting signals is reset, it is possible to control the engine with control coefficients corresponding to the crank angle detecting signals for one cylinder, so that the burden on the control device of the engine can be reduced.

In addition, when determining the next and following signal sets after the initial signal set has been determined by the first signal set determining means 35 and the second signal set determining means 36, it is determined as an additional condition whether or not the cylinder number (the first cylinder or the fourth cylinder) and the number of generation of the crank angle detecting signals are those corresponding to "the first signal set" or "the second signal set" by the additional condition considering means 44. Therefore, the determination accuracy of the second and the following signal sets can be improved.

When the cylinder number updated by the cylinder number update means 43 is a predetermined number and the number of generation of the crank angle detecting signals counted by the crank angle signal counting means 42 is a predetermined value, it is determined by the cylinder number crank angle detecting signal determining means 45 whether or not the crank angle detecting signal for every one rotation is obtained. Therefore, the engine can be controlled only by the crank angle detecting signals and the cam angle detecting signals can be eliminated as a determining factor, so that interruption processing of the cam angle detecting signals to the engine control device can be reduced. Thus, the burden on the control device of the engine can be reduced.

When the number of times of consecutive determination (the number of times of recording) of the signal set of the same number recorded in the recording means 46 reaches a predetermined number of times, it is determined by the recording number abnormality determining means 47 that abnormality has been reached. Therefore, abnormality can be determined easily by recording the number of times when the signal set of the same number is determined consecutively.

In addition, when it is determined by the count reference determining means 37 that the count reference of the crank angle has reached, the recording number of the signal sets of the same number recorded in the recording means 46 is reset by the signal set number reset means 48. Therefore, error factors such as consecutive determination of the same signal sets can be eliminated, and the next determination of the count reference of the crank angle can be performed without carrying the error factors over.

Furthermore, when it is determined that at least one of the generation time interval Tn of the present and the previous cam angle detecting signals and the previous generation time interval Tn−1 of the cam angle detecting signals measured by the second timer means 32 is the maximum time Tmax, the present cam angle detecting signal is determined to be invalid by the cam angle detecting signal invalid determining means 52, regardless of the determination results of the second determining means 34 as to whether the signal is a cam angle detecting signal for every predetermined angle or a cam angle detecting signal for every one rotation. Therefore, for example, at the time of engine start or restart, or due to erroneous detection of a cam angle detecting signal because a cam angle detecting signal is missing or noise is mixed, it may be determined erroneously that the signal is a cam angle detecting signal for every one rotation, although it is a cam angle detecting signal for every predetermined angle, when the generation time interval Tn between the present and the previous cam angle detecting signals is compared with the previous generation time interval Tn−1 between the cam angle detecting signals. However, if the generation time interval of a cam angle detecting signal is determined as the maximum time Tmax when it is a predetermined time or more, the present cam angle detecting signal is determined to be invalid. Thus, erroneous identification of a cam angle detecting signal can be reduced and the determination accuracy of the count reference of the crank angle can be further enhanced.

The first determining means 33 and the second determining means 34 are provided with the first and the second abnormality determining means 53, 61. Therefore, for example, when a pulse signal is missing or noise is mixed by the abnormality of the crank angle signal detector 13, the cam angle signal detector 23, the protrusions 12*a*, 22*a*, 22*b* and the like, the following determination is performed: it is determined by the first determining means 33 whether or not the crank angle detecting signal is abnormal when the present and the previous generation time intervals of the crank angle detecting signals are compared in order to determine whether or not the detecting signal obtained based on the crankshaft synchronization rotating member 12 is a crank angle detecting signal for every predetermined angle; and it is determined by the second determining means 34 whether or not the cam angle detecting signal is abnormal when the present and the previous generation time intervals of the cam angle detecting signals are compared in order to determine whether the detecting signal obtained based on the camshaft synchronization rotating member 22 is a cam angle detecting signal for every predetermined angle or a cam angle detecting signal for every one rotation. In addition, the abnormal determination conditions by the first and the second abnormality determining means 53, 61 are set based on the running state of the engine. Therefore, for example, even if the rotation speeds of the crankshaft synchronization rotating member 12 and the camshaft synchronization rotating member 22 are changed by the running conditions of the engine such as the load on the engine, at the time immediately after the start or acceleration or deceleration, the abnormality of the first determining means 33 and the abnormality of the second determining means 34 can be determined smoothly without depending on the running state.

Then, when it is determined by the first abnormality determining means 53 that abnormality has been reached, the time interval from the time when the signal is determined to be a cam angle detecting signal for every one rotation to the start of engine control is measured by the control timing measuring means 54. Therefore, when the crank angle detecting signal for every predetermined angle and the a crank angle detecting signal for every one rotation are not reliable because of abnormality generation in the first determining means 33, the engine control start timing from the point of time when a cam angle detecting signal that is one for every one rotation is detected by the second determining means 34 is measured. Then, without depending on the crank angle detecting signal for every predetermined angle and the crank angle detecting signal for every one rotation, engine control start timing can be determined smoothly based on the measured value from the point of time when a cam angle detecting signal for every one rotation is detected by the second determining means 34.

When the cam angle detecting signal for every predetermined angle and the cam angle detecting signal for every one rotation are not reliable because of abnormality determination in the second abnormality determining means 61, the cylinder number is determined provisionally with the crank angle detecting signal for every predetermined angle and the crank angle detecting signal for every one rotation that are determined by the first determining means 33, and that point is determined to be the count reference of the crank angle, and then the engine control continues. If there is no problem in the behavior of the engine when the engine control is performed, it is determined that the provisionally determined cylinder number is correct. On the other hand, if there is any problem in the behavior of the engine, it is determined that the provisionally determined cylinder number is not correct. Thus, the engine control start timing from the point of time when a crank angle detecting signal for every predetermined angle and a crank angle detecting signal that is one for every one rotation are detected by the crank angle detecting signal determining means is measured. Therefore, engine control start timing can be determined smoothly based on the measured value from the point of time when a crank angle detecting signal for every predetermined angle and a crank angle detecting signal for every one rotation are detected by the first determining means 33, without depending on the cam angle detecting signal for every predetermined angle and the cam angle detecting signal for every one rotation.

OTHER EMBODIMENTS

The present invention is not limited to the above-described embodiment, and includes other various variations. For example, in the above-embodiment, when it is determined by the first abnormality determining means 53 that abnormality has been reached, the time interval from the time when a cam angle detecting signal for every one rotation is detected to the start of engine control is measured by the control timing measuring means 54. However, as shown by a double dotted chain line in FIG. 1, cam angle reference control timing measuring means 56 for measuring the time interval from when the cam angle detecting signal for every predetermined angle and the cam angle detecting signal for every one rotation are determined by the second determining means 34 to the start of the engine control, cam angle detecting signal counting means 57 for counting the number of times of signal generation every time a cam angle detecting signal is generated from when the signal is determined to be the cam angle detecting signal for every predetermined angle or a cam angle detecting signal for every one rotation by the second determining means 34, and cam angle detecting signal reset means 58 for resetting the number of times of generation of cam angle detecting signals counted by the cam angle detecting signal counting means when the signal is determined to be a cam angle detecting signal for every predetermined angle or a cam angle detecting signal for every one rotation is determined by the second determining means 34 are included. When it is determined by the first abnormality determining means 53 that abnormality has been reached, engine control may be performed by the cam angle reference control timing measuring means 56. In this case, when the crank angle detecting signal for every predetermined angle and the a crank angle detecting signal for every one rotation are not reliable because of abnormality determination in the first abnormality determining means 53, the engine control start timing from the point of time when a cam angle detecting signal for every predetermined angle and the cam angle detecting signal that is one for every one rotation are detected by the cam angle detecting signal determining means may be measured. Then, without depending on the crank angle detecting signal for every predetermined angle and the crank angle detecting signal for every one rotation, engine control start timing can be determined smoothly based on the count number from the point of time when a cam angle detecting signal for every predetermined angle and a cam angle detecting signal for every one rotation is detected by the second determining means 34.

In the above-described embodiment, the case where engine control timing is measured to control the fuel jetting time or the fuel jetting period of the engine has been described, but the present invention can be applied to control the ignition time for gasoline engines or gas engines. In short, the present invention can be applied to any engines such as diesel engines, gasoline engines, and gas engines.

Furthermore, in the above-described embodiment, a plurality of protrusions 12a, . . . are provided in the outer circumference of the crankshaft synchronization rotating member 12, and a plurality of protrusions 22a, . . . corresponding to the cylinders one to one and a single protrusion 22b are provided in the outer circumference of the camshaft synchronization rotating member 22. However, a plurality of recesses may be provided at every predetermined angle in the crankshaft synchronization rotating member, and a plurality of recesses corresponding to the cylinders one to one and a single recess may be provided in the camshaft synchronization rotating member. Alternatively, a plurality of holes may be provided at every predetermined angle in the crankshaft synchronization rotating member, and a plurality of holes corresponding to the cylinders and a single hole may be provided in the camshaft synchronization rotating member. In short, any structure can be used, as long as it can be detected by a detector. Regarding the structure of the first and the second detectors, there is no particular limitation, and in addition to electromagnetic pick-up type of detectors, any forms such as light transmission type or hole type can be used.

In addition, in the above-described embodiment, six protrusions 22a, . . . , each of which correspond to a cylinder of a six-cylinder engine and a protrusion 22b positioned before the protrusion 22a of the reference position B of the cam angle are provided in the outer circumference of the camshaft synchronization rotating member 22. However, when the present invention is applied to a four-cylinder engine, four protrusions at every 90° of the cam angle each of which corresponds to a cylinder thereof and a protrusion positioned before the protrusion in the reference position B of the cam angle may be provided in the outer circumference of the camshaft synchronization rotating member. Similarly, in the case of a three-cylinder engine, three protrusions at every 120° of the cam angle and a protrusion positioned before the protrusion in the reference position B of the cam angle may be provided; in the case of an eight-cylinder engine, eight protrusions at every 45° of the cam angle and a protrusion positioned before the protrusion in the reference position B of the cam angle may be provided, and in the case of a twelve-cylinder engine, 12 protrusions at every 30° of the cam angle and a protrusion positioned before the protrusion of the reference position B of the cam angle may be provided. Furthermore, protrusions in the number corresponding to the lowest common denominator (e.g., 12 when used in both a three-cylinder and four-cylinder engines) at equal intervals and a protrusion positioned before the protrusion in the reference position B of the cam angle may be provided in the outer circumference of the camshaft synchronization rotating member so as to be used in engines having different numbers of cylinders.

In the above-described embodiment, the count reference A of the crank angle (the reference position A of the crank angle) is set at the rising edge position of a pulse signal (protrusion 12a) in the rotation direction of the crankshaft synchronization rotating member 12, and the reference position B of the cam angle is set at the rising edge position of a pulse signal (protrusion 22a) in the rotation direction of the camshaft synchronization rotating member 22. However, the count reference of the crank angle (the reference position A of the crank angle) and the reference position of the cam angle may be set at the central position of a pulse signal in the circumferential direction of the respective synchronization rotating members, or the count reference of the crank angle and the reference position of the cam angle may be set at the falling edge position of a pulse signal in the circumferential direction of the respective synchronization rotating members. Furthermore, the count reference of the crank angle may be set at the central position in a portion corresponding to the two missing protrusions in the circumferential direction of the crankshaft synchronization rotating member, and there is no particular limitation, as long as it serves as a reference.

The present application is based on Japanese Application No. 2002-285874 that is filed in Japan, which is incorporated herein by reference. The references cited herein are entirely incorporated by reference.

INDUSTRIAL APPLICABLITY

The crank angle identifying device of an engine of the present invention can be applied to any engine, and is useful, in particular, to four-cycle engines having a plurality of cylinders. According to this crank angle identifying device of an engine of the present invention, the count reference of the crank angle is determined based on not only the first signal set that is defined when the crank angle detecting signal for every one rotation of the crankshaft synchronization rotating member and the cam angle detecting signal for every one rotation of the camshaft synchronization rotating member are detected within a predetermined angle, but also the second signal set that is defined when the crank angle detecting signal for every one rotation of the crankshaft synchronization rotating member and the cam angle detecting signal for every predetermined angle of the camshaft synchronization rotating member are detected within a predetermined angle. Therefore, the count reference of the crank angle can be determined in an early stage, and the accuracy of identifying the cylinder number and the crank angle of an engine can be improved by determining the count reference of the crank angle with the signals sets that are consecutive in the order of the first, the second, and the first, or the second, the first, and the second signal sets.

The invention claimed is:

1. A device for identifying a crank angle of an engine, comprising:

crank angle signal detecting means that is supplied with a crank angle detecting signal for every predetermined angle and a crank angle detecting signal for every one rotation, based on a crankshaft synchronization rotating member that rotates in synchronization with a crankshaft;

cam angle signal detecting means that is supplied with a cam angle detecting signal for every predetermined angle and a cam angle detecting signal for every one rotation, based on a camshaft synchronization rotating member that rotates in synchronization with a camshaft at a speed reducing ratio of ½ with respect to the crankshaft;

first measuring means for measuring a generation time interval of the crank angle detecting signals obtained based on the crankshaft synchronization rotating member;

second measuring means for measuring a generation time interval of the cam angle detecting signals obtained based on the camshaft synchronization rotating member;

crank angle detecting signal determining means for comparing a generation time interval between the present and the previous crank angle detecting signals and a generation time interval between the previous and the previous before previous crank angle detecting signals measured by the first measuring means to determine whether the present crank angle detecting signal measured by the first measuring means is a crank angle detecting signal for every predetermined angle or a crank angle detecting signal for every one rotation;

cam angle detecting signal determining means for comparing a generation time interval between the present and the previous cam angle detecting signals and a generation time interval between the previous and the previous before previous cam angle detecting signals measured by the second measuring means to determine whether the present cam angle detecting signal measured by the second measuring means is a cam angle detecting signal for every predetermined angle or a cam angle detecting signal for every one rotation;

first signal set determining means for determining a signal set to be a first signal set when determination of the crank angle detecting signal determining means that the signal is a crank angle detecting signal for every one rotation and determination of the cam angle detecting signal determining means that the signal is a cam angle detecting signal for every one rotation are performed within a predetermined angle;

second signal set determining means for determining a signal set to be a second signal set when determination of the crank angle detecting signal determining means that the signal is a crank angle detecting signal for every one rotation and determination of the cam angle detecting signal determining means that the signal is a cam angle detecting signal for every predetermined angle are performed within a predetermined angle; and count reference determining means for determining a cylinder number corresponding to the first signal or the second signal, and also determining a generation point of the present crank angle detecting signal measured by the first measuring means to be a count reference of the crank angle, when signal sets are determined by the first signal set determining means and the second signal set determining means to be the first, the second and the first signal set or the second, the first, and the second signal set sequentially in this order.

2. The device for identifying a crank angle of an engine according to claim 1, comprising:

first count reference provisionally determining means for provisionally determining a cylinder number corresponding to the first signal or the second signal and also provisionally determining a generation point of the present crank angle detecting signal measured by the first measuring means to be a count reference, when an initial signal set is determined by the first signal set determining means and the second signal set determining means.

3. The device for identifying a crank angle of an engine according to claim 1 or 2, comprising:

crank angle signal counting means for counting the number of signal generations every time a crank angle detecting signal is generated; and cylinder number update means for resetting the number of times of generation of detecting signals, and updating the cylinder number, when the number of times of generation of the crank angle detecting signal counted by the crank angle signal counting means reaches a predetermined value.

4. The device for identifying a crank angle of an engine according to claim 3, comprising:

additional condition considering means for determining as an additional condition whether or not the cylinder number and the number of generation of the crank angle detecting signals are those corresponding to the first or the second signal set when determining the next and following signal sets after the initial signal set has been determined by the first signal set determining means and the second signal set determining means.

5. The device for identifying a crank angle of an engine according to claim 3, comprising:

cylinder number crank angle detecting signal determining means for determining whether or not determination that the signal is a crank angle detecting signal for every one rotation has been obtained by the crank angle signal detecting determining means, when the cylinder number updated by the cylinder number update means is a predetermined number and the number of generation of the crank angle detecting signals counted by the counting means is a predetermined value.

6. The device for identifying a crank angle of an engine according to claim 1, comprising:

recording means for recording the number of times of consecutive determination of signal sets of the same number by the first signal set determining means and the second signal set determining means; and recording number abnormality determining means for determining that abnormality has been reached, when the number of times of recording recorded by the recording means reaches a predetermined number of times.

7. The device for identifying a crank angle of an engine according to claim 6, comprising:

signal set number reset means for resetting the number of times of consecutive determination of signal sets of the same number that is recorded in the recording means, when it is determined by the count reference determining means that a generation point of the present crank angle detecting signal measured by the first measuring means is a count reference of the crank angle.

8. The device for identifying a crank angle of an engine according to claim 1, comprising:

maximum time determining means for determining that a generation time interval of a cam angle detecting signal measured by the second measuring means that is a predetermined time or more is a maximum time; and cam angle detecting signal invalid determining means for determining that the present cam angle detecting signal is invalid, when the generation time interval between the present and the previous cam angle detecting signals or the generation time interval between the previous and the previous before previous cam angle detecting signals measured by the second measuring means is determined to be the maximum time by the maximum time determining means, regardless of the determination results of the cam angle detecting signal determining means as to whether the signal is a cam angle detecting signal for every predetermined angle or a cam angle detecting signal for every one rotation.

9. The device for identifying a crank angle of an engine according to claim 1, wherein at least one of the crank angle detecting signal determining means and the cam angle detecting signal determining means is provided with abnormality determining means.

10. The device for identifying a crank angle of an engine according to claim 9, wherein abnormality determination conditions for the abnormality determining means are based on a running state of an engine.

11. The device for identifying a crank angle of an engine according to claim 9, wherein the abnormality determining means is provided in at least the crank angle detecting signal determining means, the abnormality determining means comprising control timing measuring means for measuring a time interval from a time when a cam angle detecting signal for every one rotation by the cam angle detecting signal determining means to start of engine control; wherein when it is determined by the abnormality determining means that abnormality has been reached, a time interval from determination of a cam angle detecting signal for every one rotation to start of engine control is measured by the control timing measuring means.

12. The device for identifying a crank angle of an engine according to claim 9, wherein the abnormality determining means is provided in at least the crank angle detecting signal determining means, comprising:

cam angle reference control timing measuring means for measuring a time interval from when a cam angle detecting signal for every predetermined angle or a cam angle detecting signal for every one rotation is determined by the cam angle detecting signal determining means to start of engine control;

cam angle detecting signal counting means for counting the number of times of signal generation every time a cam angle detecting signal is generated from when a cam angle detecting signal for every predetermined angle or a cam angle detecting signal for every one rotation is determined by the cam angle detecting signal determining means; and cam angle detecting signal resetting means for resetting the number of times of generation of cam angle detecting signals counted by the cam angle detecting signal counting means when a cam angle detecting signal for every predetermined angle or a cam angle detecting signal for every one rotation is determined by the cam angle detecting signal determining means, wherein when it is determined by the abnormality determining means that abnormality has been reached, engine control is performed by the cam angle reference control timing measuring means.

13. The device for identifying a crank angle of an engine according to claim 9, wherein the abnormality determining means is provided in at least the cam angle detecting signal determining means, comprising:

engine behavior determining means for determining behavior of an engine;

second count reference provisionally determining means for provisionally determining a cylinder number and determining that a generation point of the present crank angle detecting signal is a count reference of the crank angle, when the present crank angle detecting signal measured by the first measuring means is determined to be a crank angle detecting signal for every one rotation by the crank angle detecting signal determining means; and cylinder number-correct-or-not-determining means that continues engine control based on the crank angle detecting signal, and determines whether the cylinder number provisionally determined by the second count reference provisionally determining means is correct or not, based on the behavior of the engine determined by the engine behavior determining means when it is determined by the abnormality determining means that abnormality has been reached.

* * * * *